US008433149B2

(12) United States Patent
Tanaka et al.

(10) Patent No.: US 8,433,149 B2
(45) Date of Patent: Apr. 30, 2013

(54) IMAGE TRANSMITTER AND IMAGE RECEIVER, FOR TRANSMITTING/RECEIVING IMAGE DATA TO/FROM A DEVICE CONNECTED BY A SIGNAL DATA LINE

(75) Inventors: Yoshiteru Tanaka, Kanagawa (JP); Yasuo Kohashi, Kanagawa (JP); Toshiyuki Ishioka, Osaka (JP)

(73) Assignee: Panasonic Corporation, Osaka (JP)

( * ) Notice: Subject to any disclaimer, the term of this patent is extended or adjusted under 35 U.S.C. 154(b) by 89 days.

(21) Appl. No.: 13/129,004

(22) PCT Filed: Nov. 13, 2009

(86) PCT No.: PCT/JP2009/006078
§ 371 (c)(1), (2), (4) Date: May 12, 2011

(87) PCT Pub. No.: WO2010/055672
PCT Pub. Date: May 20, 2010

(65) Prior Publication Data
US 2011/0216980 A1   Sep. 8, 2011

(30) Foreign Application Priority Data

Nov. 17, 2008   (JP) ................. 2008-293862

(51) Int. Cl.
*G06K 9/36*   (2006.01)
*G06K 9/46*   (2006.01)
(52) U.S. Cl.
USPC ...................................... 382/232

(58) Field of Classification Search .......... 382/232, 382/284; 341/50, 51, 65, 67, 106, 107; 375/240.02, 375/240.12, 240.14, 240.25; 714/752, 780
See application file for complete search history.

(56) References Cited

U.S. PATENT DOCUMENTS

| 3,898,659 | A  | * | 8/1975  | Jensen et al. ........... 342/106 |
| 7,353,444 | B2 | * | 4/2008  | Owsley et al. .......... 714/752 |
| 8,072,359 | B2 | * | 12/2011 | Kasuya et al. ........... 341/107 |
| 2005/0258984 | A1 | * | 11/2005 | Owsley et al. ......... 341/50 |
| 2011/0216980 | A1 | * | 9/2011  | Tanaka et al. ......... 382/232 |

FOREIGN PATENT DOCUMENTS

| JP | 63-77270    | 4/1988  |
| JP | 04-371032   | 12/1992 |
| JP | 2005-55825  | 3/2005  |
| JP | 2006-163201 | 6/2006  |
| JP | 2007-281758 | 10/2007 |

* cited by examiner

*Primary Examiner* — Amir Alavi
(74) *Attorney, Agent, or Firm* — Greenblum & Bernstein, P.L.C.

(57) ABSTRACT

A system LSI serving as an image transmitter is a device for transmitting image data to a display device LCD connected by a data signal line. The system LSI comprises: an output image memory for storing the image data to be transmitted; a subtraction processing unit for reading the image data from the output image memory and obtaining the data of the difference between mutually adjacent pixels of the image data; and a data transmission unit for sequentially outputting a data signal, which expresses the difference data corresponding to the pixels as a binary number, to the data signal line in accordance with the arrangement of the pixels; wherein the data signal of the difference data in which the number of signal changes is reduced more than the case of outputting the pixel data to the data signal line is output.

15 Claims, 20 Drawing Sheets

Figure 8

| CONVERSION SOURCE VALUE | CONVERSION DESTINATION VALUE | BIT SEQUENCE | | | | | | | | NUMBER OF SIGNAL CHANGES |
|---|---|---|---|---|---|---|---|---|---|---|
| 0 | 0 | 0 | 0 | 0 | 0 | 0 | 0 | 0 | 0 | 0 |
| 1 | 1 | 0 | 0 | 0 | 0 | 0 | 0 | 0 | 1 | 1 |
| 2 | 3 | 0 | 0 | 0 | 0 | 0 | 0 | 1 | 1 | 1 |
| 3 | 7 | 0 | 0 | 0 | 0 | 0 | 1 | 1 | 1 | 1 |
| 4 | 15 | 0 | 0 | 0 | 0 | 1 | 1 | 1 | 1 | 1 |
| -1 | 31 | 0 | 0 | 0 | 1 | 1 | 1 | 1 | 1 | 1 |
| -2 | 63 | 0 | 0 | 1 | 1 | 1 | 1 | 1 | 1 | 1 |
| -3 | 127 | 0 | 1 | 1 | 1 | 1 | 1 | 1 | 1 | 1 |
| -4 | 255 | 1 | 1 | 1 | 1 | 1 | 1 | 1 | 1 | 1 |
| 5 | 2 | 0 | 0 | 0 | 0 | 0 | 0 | 1 | 0 | 2 |
| 6 | 4 | 0 | 0 | 0 | 0 | 0 | 1 | 0 | 0 | 2 |
| 7 | 6 | 0 | 0 | 0 | 0 | 0 | 1 | 1 | 0 | 2 |
| 8 | 8 | 0 | 0 | 0 | 0 | 1 | 0 | 0 | 0 | 2 |
| 9 | 12 | 0 | 0 | 0 | 0 | 1 | 1 | 0 | 0 | 2 |
| 10 | 14 | 0 | 0 | 0 | 0 | 1 | 1 | 1 | 0 | 2 |
| 11 | 16 | 0 | 0 | 0 | 1 | 0 | 0 | 0 | 0 | 2 |
| 12 | 24 | 0 | 0 | 0 | 1 | 1 | 0 | 0 | 0 | 2 |
| 13 | 28 | 0 | 0 | 0 | 1 | 1 | 1 | 0 | 0 | 2 |
| 14 | 30 | 0 | 0 | 0 | 1 | 1 | 1 | 1 | 0 | 2 |
| -5 | 32 | 0 | 0 | 1 | 0 | 0 | 0 | 0 | 0 | 2 |
| -6 | 48 | 0 | 0 | 1 | 1 | 0 | 0 | 0 | 0 | 2 |
| -7 | 56 | 0 | 0 | 1 | 1 | 1 | 0 | 0 | 0 | 2 |

SINCE THE LAST BIT OF COMPONENT R OF IMMEDIATELY-BEFORE PIXEL IS 1, NEXT-TRANSMITTED PIXEL VALUE G IS INVERTED

Figure 16A

| 100 | 102 | 103 | 103 |  |
|-----|-----|-----|-----|--|
| 101 | 101 | 103 | 102 |  |
| 100 | 102 | 104 | 103 |  |
| 101 | 102 | 102 | 103 |  |
|     |     |     |     | . . . |

Figure 16B

| 100 | 2 | 1 | 0  |  |
|-----|---|---|----|--|
| 20  | 0 | 2 | -1 |  |
| 25  | 2 | 2 | -1 |  |
| 22  | 1 | 0 | 1  |  |
|     |   |   |    | . . . |

…

IMAGE TRANSMITTER AND IMAGE RECEIVER, FOR TRANSMITTING/RECEIVING IMAGE DATA TO/FROM A DEVICE CONNECTED BY A SIGNAL DATA LINE

This application is a 371 of PCT/JP2009/006078 filed on Nov. 13, 2009.

RELATED APPLICATION

The present application claims priority from Japanese Patent Application No. 2008-293862 filed on Nov. 17, 2008 in Japan; the content of the application is hereby incorporated by reference into this application.

TECHNICAL FIELD

The present invention relates to an image transmitter and an image receiver for carrying out transmission and reception of image data, for example, between an image pickup device such as a camera and an image processing LSI or between an image processing LSI and a display device such as an LCD.

BACKGROUND ART

Recently, the sizes of the images taken in from cameras and the images output to LCDs have been increased, and therefore the image sizes handled by various equipment such as cameras, mobile terminals, and HDD recorders have been extremely increased. Correspondingly, the data volume transferred between LSIs and LCDs has been drastically increasing. For example, when the size of an image is changed from WVGA (865×480) to HD (1920×1080), the transferred data volume is increased by nearly five times. Moreover, the increase in the volume of the data that flows in a data signal line also largely affects the power consumption required for I/O of the signal line so as to be approximately proportional to the above described increase.

In order to take a measure against the above described problem, the techniques for reducing the volume of transferred data have been conventionally known. For example, in the data transfer device described in Patent Literature 1, the information of an upper part data in which the same values are continued is generated as the information of a set of the data value of that part and the number of the continuous data, thereby reducing the volume of the transferred data.

In an image display device described in Patent Literature 2, after color decrease processing which reduces the volume of data is carried out, Haffman encoding processing is carried out to compress the volume of the data.

Citation List

Patent Literature 1: Japanese Patent Laid-Open No. 2006-163201

Patent Literature 2: Japanese Patent Laid-Open No. 2005-55825

SUMMARY OF INVENTION

Technical Problem

The above described conventional techniques are the approaches that reduce the transferred data volume per se and reduce power consumption. It is an object of the present invention to provide an image transmitter and an image receiver which reduce power consumption by the methods different from those of the above described conventional techniques.

Solution to Problem

An image transmitter of the present invention is an image transmitter for transmitting image data to a device connected by a data signal line, the image transmitter comprising: an image data retention unit for storing the image data to be transmitted; a subtraction processing unit for reading the image data from the image data retention unit and obtaining data of a difference between mutually adjacent pixels of the image data; and a data transmission unit for sequentially outputting a data signal to a data signal line in accordance with an arrangement of the pixels, the data signal expressing the difference data corresponding to each pixel as a binary number; wherein the data signal of the difference data in which the number of signal changes is reduced more than a case of outputting the pixel data to the data signal line is output.

An image receiver of the present invention is an image receiver for receiving image data from a device connected by a data signal line by receiving pixel values composing the image data as a data signal expressing a difference between mutually adjacent pixels, the image receiver comprising: a data reception unit for receiving the data signal transmitted via the data signal line; and an addition processing unit for carrying out a process of adding a pixel value according to a data signal received immediately before the received data signal to the received data signal in the order of reception of the data signal by the data reception unit so as to obtain a pixel value according to the data signal received by the data reception unit; wherein the image data is generated by the pixel value obtained by the addition processing unit.

Advantageous Effects of Invention

The present invention is capable of reducing the number of signal changes in the data signal transferred on the data signal line and saving electric power by transmitting the difference data of the adjacent pixels of the image data.

As explained below, the present invention includes other modes. Therefore, the disclosure of the present invention intends provision of part of the present invention, but does not intend to limit the scope of the invention described and claimed herein.

BRIEF DESCRIPTION OF DRAWINGS

FIG. 8 is a drawing showing an example of the data stored in a conversion table.

FIG. 16A is a drawing showing an example of pixel values of the pixels composing image data.

FIG. 16B is a drawing showing the data of the differences from adjacent pixels.

DESCRIPTION OF EMBODIMENTS

Hereinafter, detailed explanations of the present invention will be described. The embodiments explained below are mere examples of the present invention, and the present invention can be modified to various modes. Therefore, the particular configurations and functions disclosed below do not limit the claims of the present invention.

Hereinafter, the embodiments of the present invention will be explained with reference to drawings. Hereinafter, a display system having a system LSI and a display device LCD is explained as an example. The system LSI transmits image data to the display device LCD. The system LSI corresponds to an image transmitter, and the display device LCD corresponds to an image receiver.

(First Embodiment0

Figure 1:
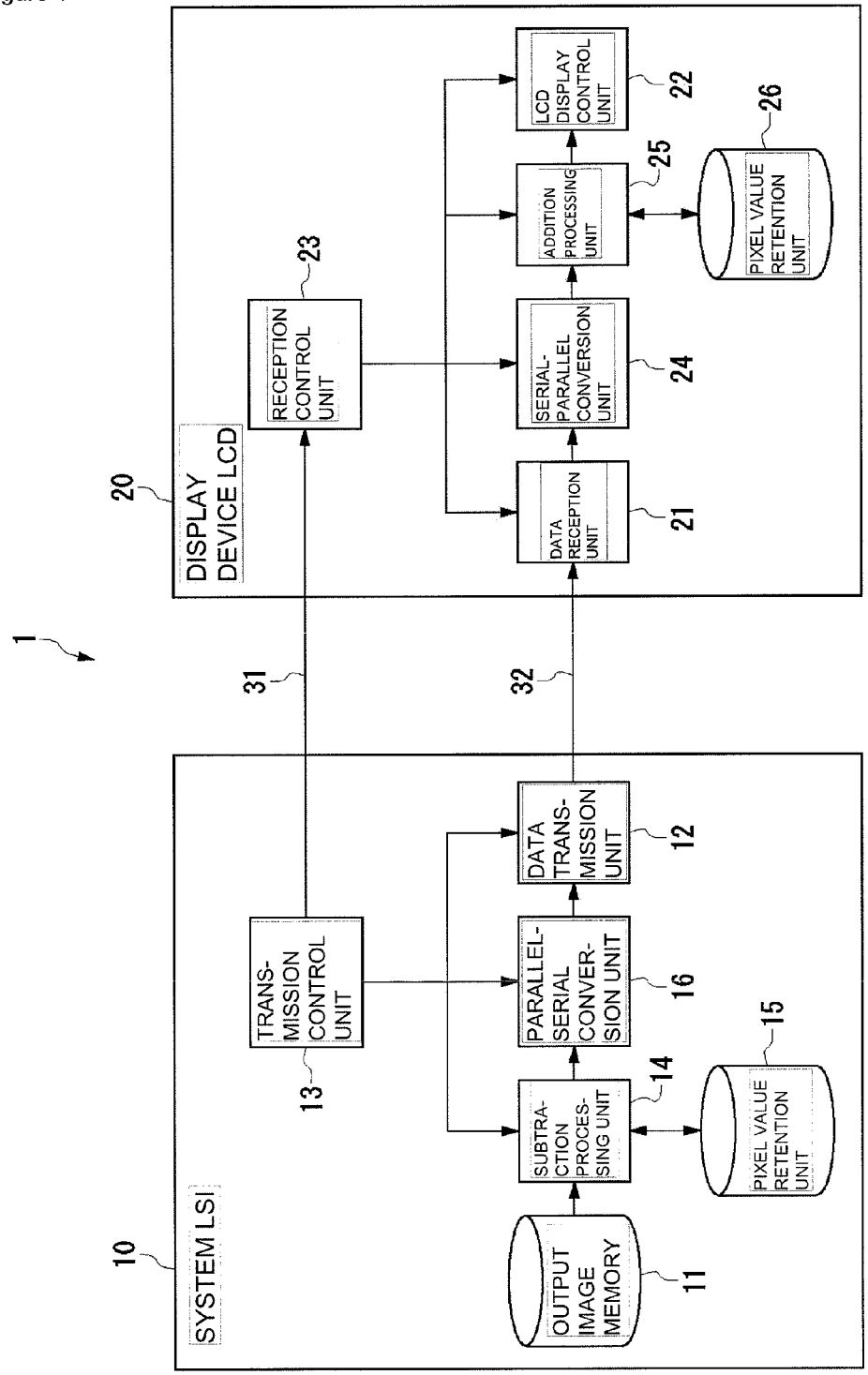
FIG. 1 is a drawing showing the configuration of a system LSI and a display device LCD of a first embodiment.

FIG. 1 is a drawing showing the configuration of a display system 1 of a first embodiment of the present invention. The display system 1 of the first embodiment has a system LSI 10 and a display device LCD 20. The system LSI 10 and the display device LCD 20 are connected to each other by a control signal line 31, which transmits control signals, and a data signal line 32, which transmits data signals.

The control signal line 31 is a signal line which transfers control signals, which control the transmission timing of images, such as horizontal synchronization signals (H Sync) and vertical synchronization signals (V Sync) from the system LSI 10 to the display device LCD 20. The data signal line 32 is a signal line which transfers the data of images in synchronization with the control signals of the control signal line 31.

(Image Transmitter)

Next, the system LSI 10 serving as the image transmitter will be explained. The system LSI 10 has: an output image memory 11, which retains the images to be output to the display device LCD 20; a data transmission unit 12, which outputs data to the data signal line 32; and a transmission control unit 13, which controls transmission timing and transmits the control signals to the control signal line 31.

Moreover, the system LSI 10 has: a subtraction processing unit 14, which reads the pixel values constituting image data from the output image memory 11, obtains the difference between the read pixel value and a previously-read pixel value, and obtains difference data; a transmission pixel value retention unit 15, which stores the pixel value which is most recently read from the output image memory 11; and a parallel-serial conversion unit 16, which subjects the difference data obtained by the subtraction processing unit 14 to parallel-serial conversion. Hereinafter, these components of the system LSI 10 will be explained.

The transmission control unit 13 generates the transmission timing of images such as the horizontal synchronization signals (H Sync) and the vertical synchronization signals (V Sync) and transmits the signals to the control signal line 31. Moreover, the transmission control unit 13 indicates operation timing for the subtraction processing unit 14, the parallel-serial conversion unit 16, and the data transmission unit 12 so that images are transferred to the data signal line 32 in synchronization with the control signals that flow to the control signal line 31.

The subtraction processing unit 14 obtains the difference data by a process of subtracting the pixel value retained in the pixel value retention unit 15 (pixel value transmitted immediately before) from the pixel value read from the output image memory 11. In other words, the difference data is obtained by: (difference data)=(most-recently read pixel value)−(pixel value read immediately before the most-recently read pixel value). The subtraction processing unit 14 passes the obtained difference data to the data transmission unit 12 and stores the most-recent pixel value, which is read from the output image memory 11, in the pixel value retention unit 15. The pixel value retention unit 15 is composed of a memory such as a RAM.

Figure 2A:
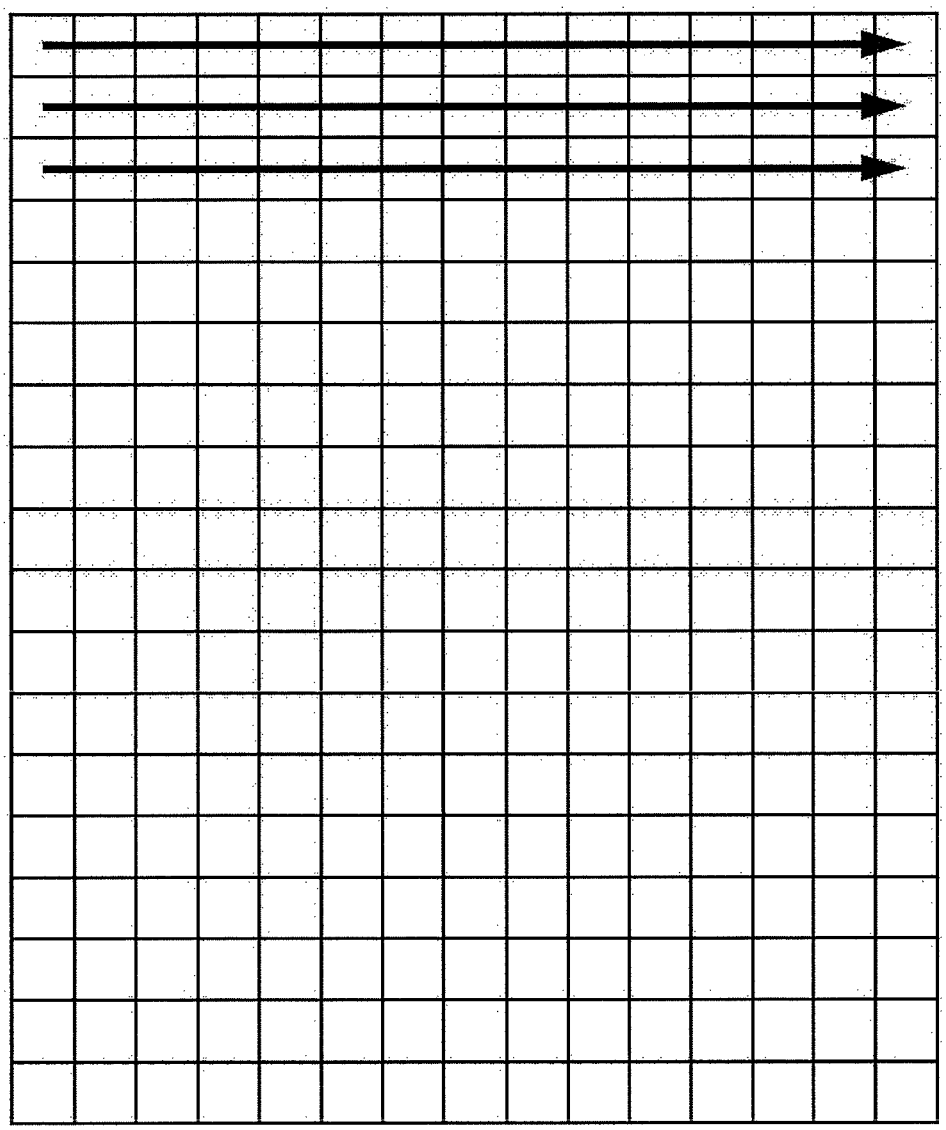
FIG. 2A is a drawing showing an example of the reading order of pixels.

FIG. 2A is a drawing showing the order of reading the pixel values by the subtraction processing unit 14 from the output image memory 11. The subtraction processing unit 14 sequentially acquires the pixel values in each line from the left top corner of the image data stored in the output image memory 11 and carries out the subtraction process. The order of reading is the same as the direction of scanning upon image display.

When the pixel data is composed of a plurality of components such as R, G, and B, the subtraction processing unit 14 carries out the subtraction process for the components, respectively. For example, the subtraction processing unit 14 carries out the subtraction process of a component R of the pixel read immediately before and a component R of a newly-read pixel and obtains the difference data. The subtraction processing unit 14 carries out a similar process also for the pixel components G and B.

The subtraction processing unit 14 initializes the value of the pixel value retention unit 15 to 0 before the difference data of a top pixel of the image is generated. In the example of FIG. 2A, the top pixel of the image is the initially-read pixel at the upper left corner. The timing of the initialization is indicated by the transmission control unit 13 when the data of the pixel to be processed by the subtraction processing unit 14 is output at the rise of the control signal V Sync (in other words, when the pixel is the top pixel of the image). When the vertical synchronization signal (V Sync) is 0, the transmission control unit 13 may order the subtraction processing unit 14 to carry out initialization only once. Alternatively, the initialization may be carried out every time reading of one line is finished and reading of a next line is started.

The data transmission unit 12 sequentially outputs the difference data, which is obtained by the subtraction processing unit 14, to the serial data signal line 32.

(Image Receiver)

Next, the configuration of the display device LCD 20 serving as the image receiver will be explained. The display device LCD 20 has: a data reception unit 21, which receives the data transmitted through the data signal line 32; a LCD display control unit 22, which displays images based on the received data; and a reception control unit 23, which receives the control signals transmitted through the control signal line 31 and indicates the processing timing of the received data for various components.

Moreover, the display device LCD 20 has: a serial-parallel conversion unit 24, which subjects the serial data received by the data reception unit 21 to serial-parallel conversion; an addition processing unit 25, which carries out addition of the received data output from the serial-parallel conversion unit 24 and the pixel value according to the data received immediately before the above mentioned received data so as to obtain a pixel value; and a pixel value retention unit 26, which retains the pixel value obtained by the addition processing unit 25. Hereinafter, these components of the display device LCD 20 will be explained.

The LCD display control unit 22 is a control unit which displays images on a screen. The LCD display control unit 22 sequentially receives the data of the pixel values output from the addition processing unit 25 and displays the images on the screen based on the control signals from the reception control unit 23.

The addition processing unit 25 adds the received difference data and the immediately-before pixel data retained in the pixel value retention unit 26, thereby obtaining the pixel value according to the received difference data. In other words, the data of the pixel value is obtained by: (data of pixel value)=(received difference data)+(pixel data received immediately before the received difference data). The addition processing unit 25 stores the obtained pixel value in the pixel value retention unit 26 and transmits the pixel value to the LCD display control unit 22. The pixel value retention unit 15 is composed of a memory such as a RAM. When the pixel data is composed of a plurality of components such as R, G, and B, the addition process is carried out for each of the components, and the data of the pixel values thereof is output to the LCD display control unit 22.

Moreover, the addition processing unit 25 initializes the value of the pixel value retention unit 26 to 0 before the process with respect to the difference data of the top pixel of an image is carried out. The timing of the initialization is indicated by the reception control unit 23 when the data to be processed next by the addition processing unit 25 is received at the rise of the control signal V Sync (in other words, when the pixel is the top pixel of the image). When the horizontal synchronization signal (V Sync) is 0, the reception control unit 23 may order the addition processing unit 25 to carry out initialization only once. Alternatively, the initialization may be carried out every time reading of one line is finished and reading of a next line is to be started. The timing of the initialization has to be linked with that of the system LSI 10.

Figure 3:
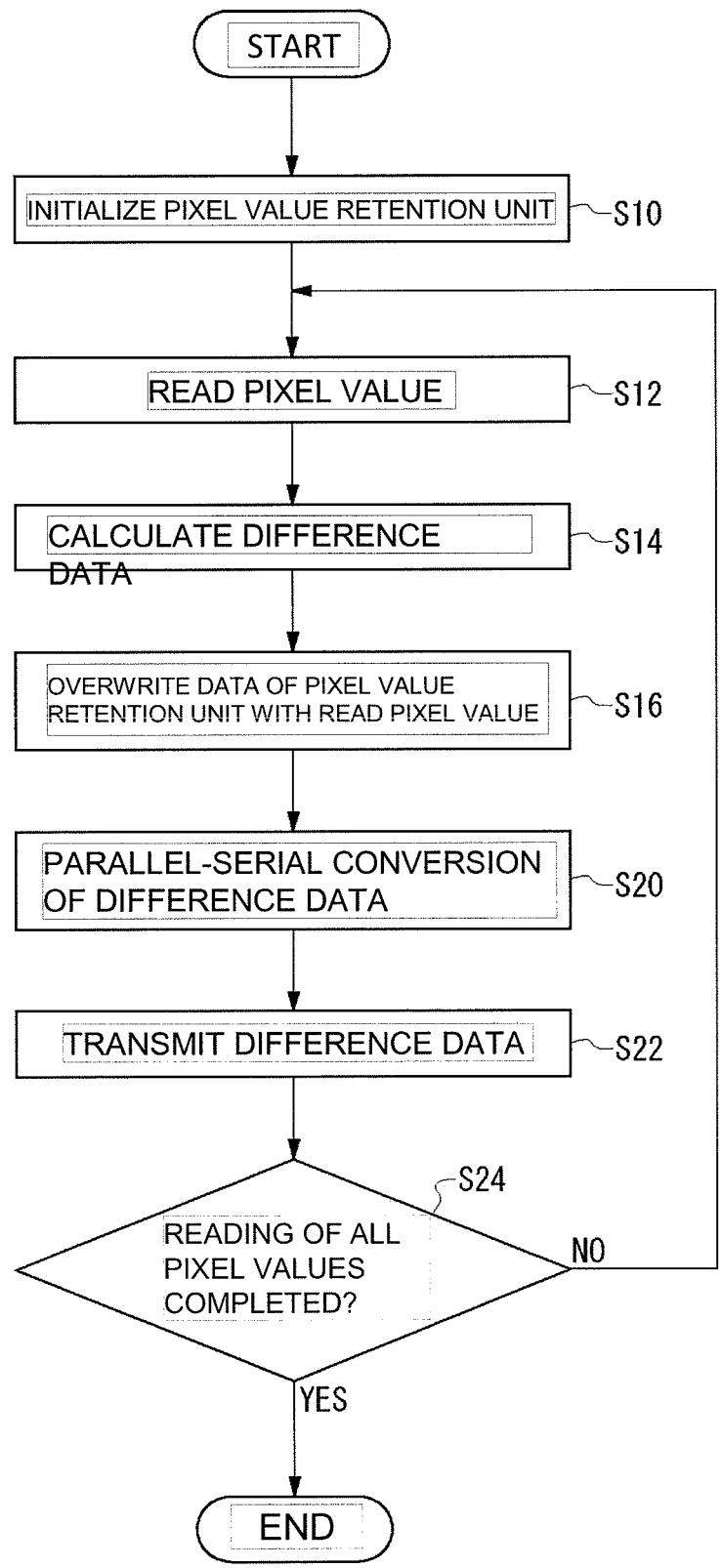
FIG. 3 is a flow chart showing the operation of the system LSI of the first embodiment.

FIG. 3 is a flow chart showing the operation of the system LSI 10. The system LSI 10 first initializes the pixel value retention unit 15 (S10). Herein, the system LSI 10 stores 0 as an initial value of the pixel value in the pixel value retention unit 15.

Next, the system LSI 10 reads a pixel value from the output image memory 11 (S12). First, the pixel value of the pixel at the upper left corner shown in FIG. 2A is read. The system LSI 10 calculates difference data by the subtraction processing unit 14 (S14). The subtraction processing unit 14 obtains the difference data by: (difference data)=(most-recently read pixel value)−(pixel value read immediately before the most-recently read pixel value). The pixel value read immediately before the most-recently read pixel value is stored in the pixel value retention unit 15. First, 0 is stored as the initial value in the pixel value retention unit 15; therefore, the pixel value of the pixel of the upper left corner serves as the difference data without change. Subsequently, the system LSI 10 overwrites the data of the pixel value retention unit 15 with the read pixel value (S16).

The system LSI 10 converts the difference data, which is obtained by the subtraction processing unit 14, to serial data by the parallel-serial conversion unit 16 (S20) and transmits the converted difference data by the data transmission unit 12 (S22).

The system LSI 10 determines whether reading of all of the pixel values composing the image data has been completed or not (S24). When it is determined that the reading of all the pixel values has been completed as a result of the determination (YES in S24), transfer of the data corresponding to one screen is completed. When it is determined that the reading of all of the pixel values has not been completed (NO in S24), a next pixel value is read from the image data (S12).

Subsequently, the operation carried out upon reading of the next pixel value will be explained. The system LSI 10 reads the pixel value of the next (herein, second) pixel in accordance with the reading order shown in FIG. 2A and obtains the difference between the pixel value of the read pixel (second pixel) and the pixel value of the immediately-before pixel (first pixel) retained in the pixel value retention unit 15 (S14). Subsequently, the system LSI 10 overwrites the pixel value retention unit 15 with the pixel value of the read pixel (second pixel) (S16), subjects the difference data to parallel-serial conversion (S20), and outputs the converted difference data to the data signal line 32 (S22). Then, the system LSI 10 determines whether the reading of the pixel values of all of the pixels composing the image data has been completed or not (S24). Hereinafter, the above described process is repeatedly carried out until reading of all of the pixel values composing the image data is completed.

Figure 4:
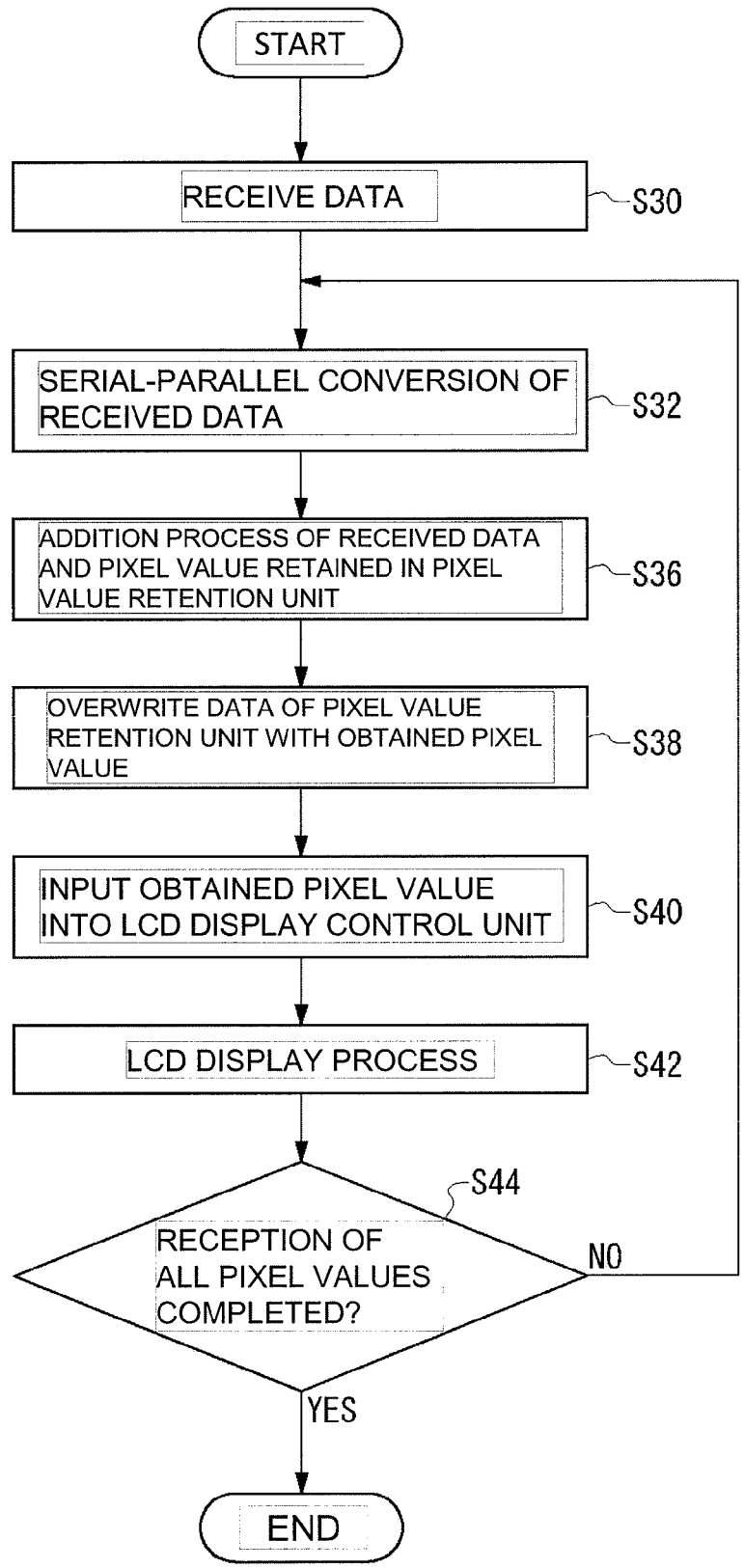
FIG. 4 is a flow chart showing the operation of the display device LCD of the first embodiment.

FIG. 4 is a flow chart showing the operation of the display device LCD 20. The display device LCD 20 receives the data transmitted through the data signal line 32 (S30) and converts the received data to parallel data by the serial-parallel conversion unit 24 (S32). Herein, the received data is the data expressing a pixel value by the difference from the pixel value of an adjacent pixel.

Next, the display device LCD 20 adds the received data to the data of the pixel value (pixel value immediately before the pixel value of the received data) retained in the pixel value retention unit 26 so as to obtain the pixel value according to the received data (S36). The display device LCD 20 overwrites the pixel value retention unit 26 with the obtained pixel value (S38) and inputs the obtained pixel value to the LCD display control unit 22 (S40). The LCD display control unit 22 carries out a display process of LCD by using the data of the input pixel value (S42). The pixel data transmitted from the system LSI 10 is the pixel value read in accordance with the scanning direction; therefore, the LCD display control unit 22 can carry out the display with respect to the LCD by sequentially transmitting the data of the pixel values, which are obtained from the received data, to the LCD display control unit 22.

The display device LCD 20 determines whether all of the pixel values have been received or not (S44); and, when it is determined that the reception is completed (YES in S44), the reception of the data corresponding to one screen is completed. The display device LCD 20 repeatedly carries out the above described process until the reception of all of the pixel values is completed. Hereinabove, the system LSI 10 and the display device LCD 20 of the present embodiment have been explained.

Figure 5:
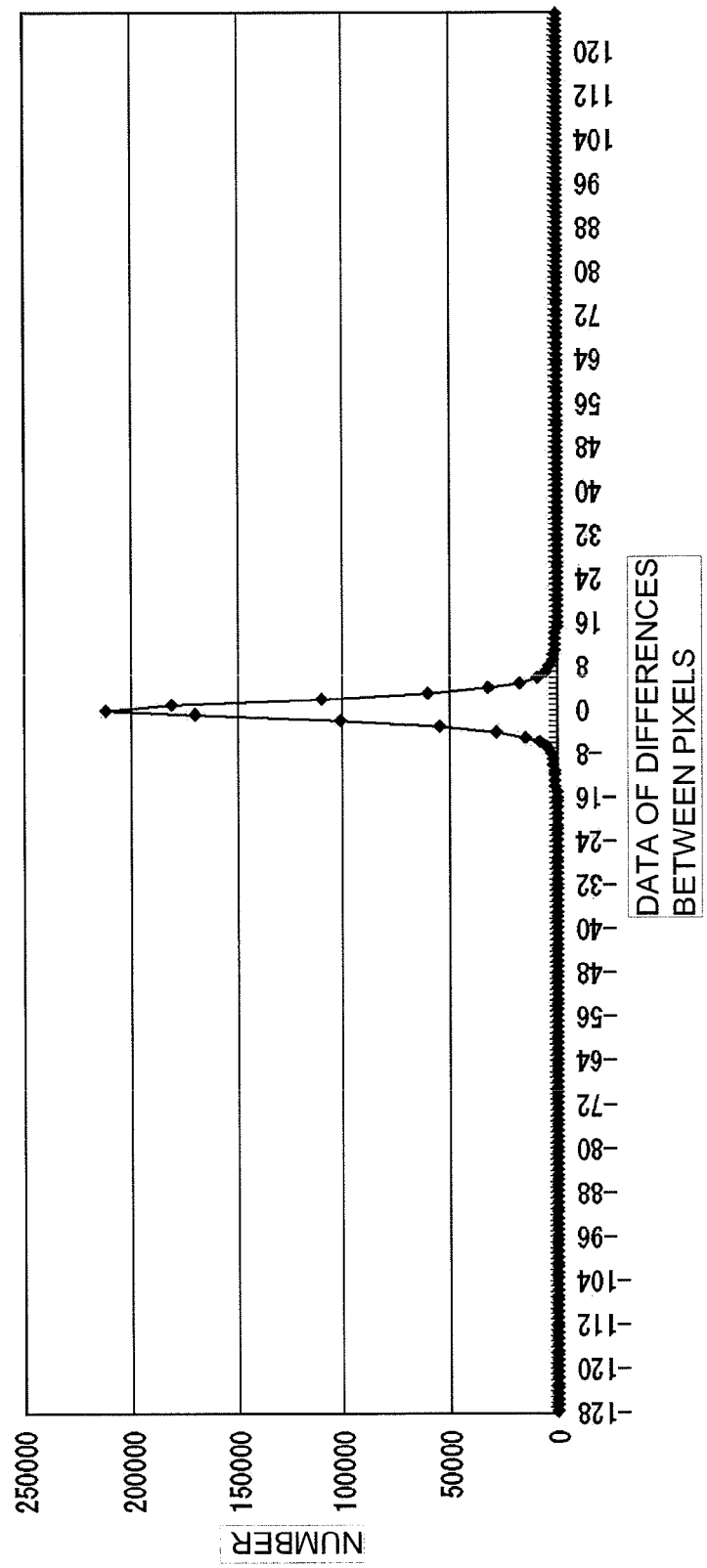
FIG. 5 is a drawing showing the results of obtaining the data of the differences between pixels by using a test image.

The system LSI 10 of the present embodiment converts the data of the pixel value, which is read from the output image memory 11, to the difference data with respect to the immediately-before pixel value and transmits the difference data to the data signal line 32. In an image, generally, adjacent pixel values often have similar values; therefore, the differences between the adjacent pixels are often smaller than the data of the pixel values. FIG. 5 is a drawing showing the result of obtaining the data of the differences between pixels by using a test image, and the data of the differences between the pixels is concentrated from −7 to 7.

The values of the difference data are small in this manner; therefore, 0 or 1 are continued in the higher bits of the difference data, and signal changes do not readily occur in higher bits. Herein, the signal change is to undergo a change from "0" to "1" and to undergo a change from "1" to "0" in the data expressed as binary numbers of "1" and "0". Electric power is charged in order to transmit the data of "1" to the data signal line 32, and the electric power is discharged in order to transmit the data of "0". Therefore, when the number of signal changes is increased, the number of charge/discharge cycles is increased, and power consumption is increased. In the present embodiment, power consumption can be reduced by suppressing the signal changes in the higher bits by using the difference data.

Figure 6A:
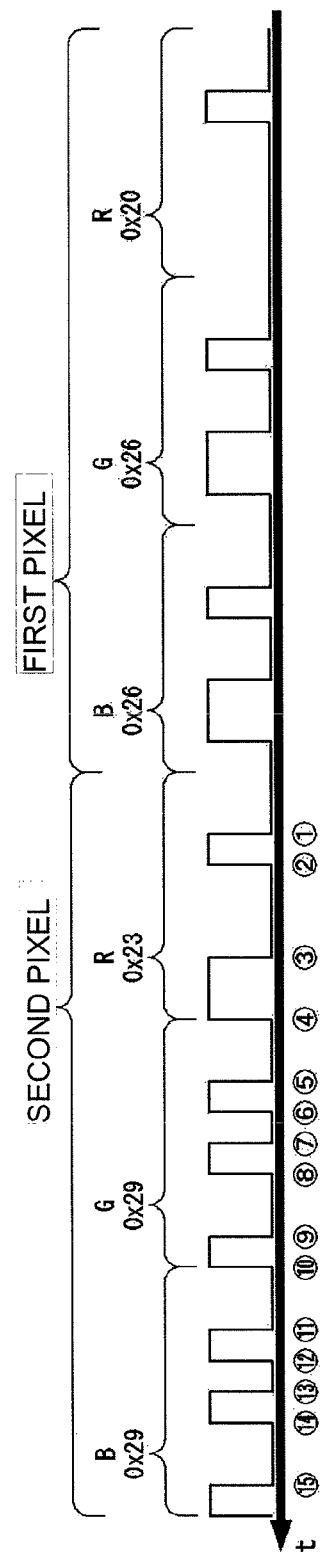
FIG. 6A is a drawing showing the number of signal changes as an example of a conventional data signal.
Figure 6B:
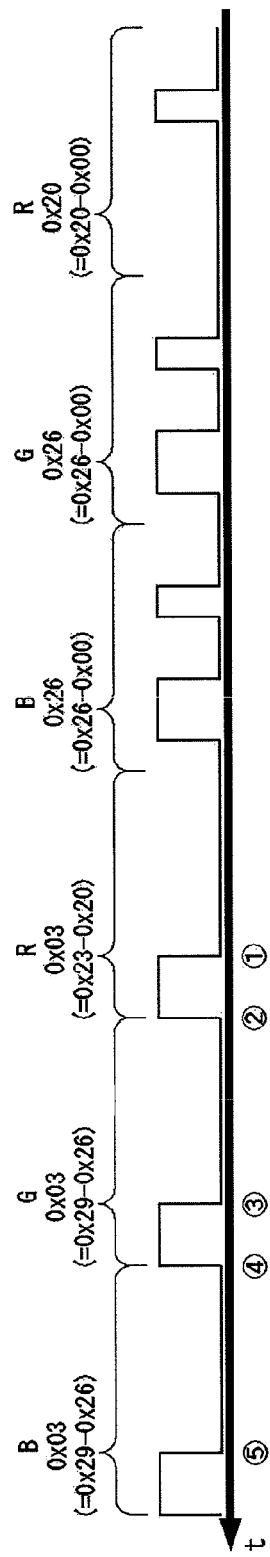
FIG. 6B is a drawing showing the number of signal changes as an example of a data signal in the present embodiment.

FIG. 6A and FIG. 6B are drawings showing examples of reducing the number of signal changes in the case in which the data of two pixels from the top pixel of an image is transmitted to the data signal line 32. FIG. 6A shows the signal changes in a conventional technique, and FIG. 6B shows the signal changes in the present embodiment. In FIG. 6A and FIG. 6B, the waveforms of the data flowing to the serial signal line are shown from the right to the left.

As shown in FIG. 6A, when the pixel data is transmitted by the conventional technique, fifteen signal changes are required in order to transmit the data of the second pixel. According to the present embodiment, in order to transmit the second R pixel value (0x23) to the display device LSI, 0x23−0x20=0x03 is transmitted as the data of the difference from an adjacent pixel (pixel immediately before the second R pixel). Similarly, in order to transmit the pixel value of G, 0x03 is transmitted instead of 0x29; and, in order to transmit the pixel value of B, 0x03 is transmitted instead of 0x29. As a result, as shown in FIG. 6B, the number of signal changes of the data signal that flows through the data signal line 32 can be reduced to five.

As described above, when the pixel value is converted to the difference data, the higher bits of the second pixel and the pixels subsequent thereto can be converted to the small values in which "0" or "1" are continued, and the data change amount can be largely reduced in the data signal line 32. According to the experiments carried out by the present inventors by using several sample images, it was confirmed that the number of the signal changes in the data signal line 32 of the case in which the data was converted to the difference data was reduced by nearly 50% to 68%. Moreover, the power consumption required for I/O can be also reduced approximately proportionally by reducing the data change amount.

As described above, the system LSI 10 of the present embodiment has the effect of reducing power consumption by the simple configuration which obtains the difference data of the adjacent pixel values and transmits the obtained difference data without change.

(Second Embodiment)

Figure 7:
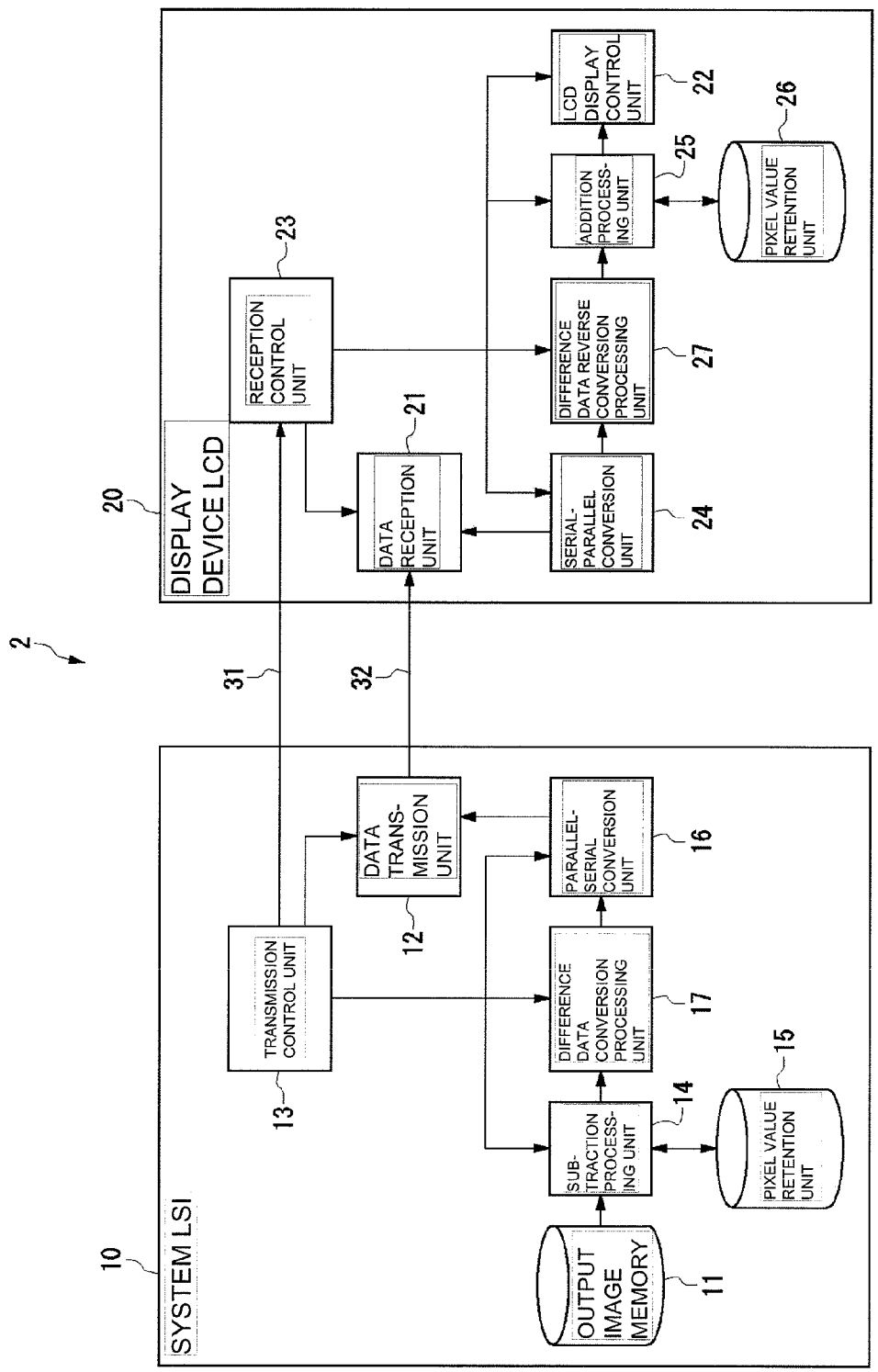
FIG. 7 is a drawing showing the configuration of a system LSI and a display device LCD of a second embodiment.

FIG. 7 is a drawing showing the configuration of a display system 2 of a second embodiment. The basic configuration of the display system 2 of the second embodiment is the same as that of the first embodiment. In the second embodiment, the system LSI 10 further has a difference data conversion processing unit 17, which converts the difference data to transmission data. Moreover, the display device LCD 20 further has a difference data reverse conversion processing unit 27, which reversely converts the transmission data to the difference data.

The difference data conversion processing unit 17 possessed by the system LSI 10 will be explained. The difference data conversion processing unit 17 has a conversion table for converting the difference data to the transmission data. FIG. 8 is a drawing showing an example of the data stored in the conversion table. Note that only part of 256 conversion patterns is extracted in this table. The conversion table is a table in which the difference data having a high appearance frequency in the difference data, in other words, the difference data closer to 0 is converted to the value having smaller number of signal changes. In the example shown in FIG. 8, when the difference data is any of 3, 4, and −1 to −4, the difference data is converted to the data in which the number of signal changes is one. The difference data conversion processing unit 17 converts the difference data, which is obtained by the subtraction processing unit 14, to the transmission data by using this conversion table.

The difference data reverse conversion processing unit 27 possessed by the display device LCD 20 has the same table as the conversion table shown in FIG. 8. The difference data reverse conversion processing unit 27 reversely converts the transmission data to the difference data by using the conversion table.

Figure 9:
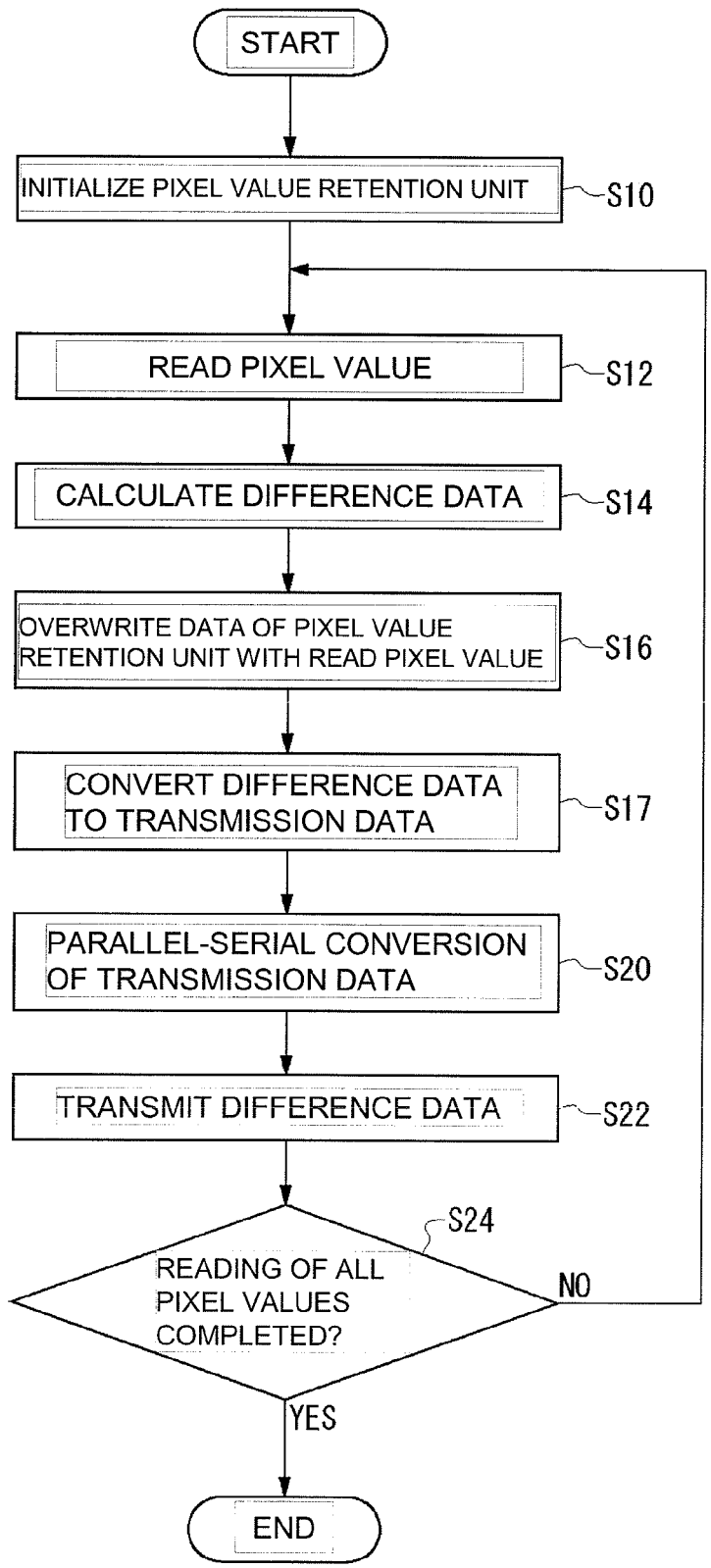
FIG. 9 is a flow chart showing the operation of the system LSI of the second embodiment.

FIG. 9 is a drawing showing the operation of the system LSI 10 of the second embodiment. The basic operation of the system LSI 10 of the second embodiment is the same as the operation of the system LSI 10 of the first embodiment. In the second embodiment, the system LSI 10 calculates the difference data by the subtraction processing unit 14 (S14) and overwrites the pixel value retention unit 15 (S16); and, then, a process of converting the difference data to the transmission data by the difference data conversion processing unit 17 (S17) is added.

Figure 10:
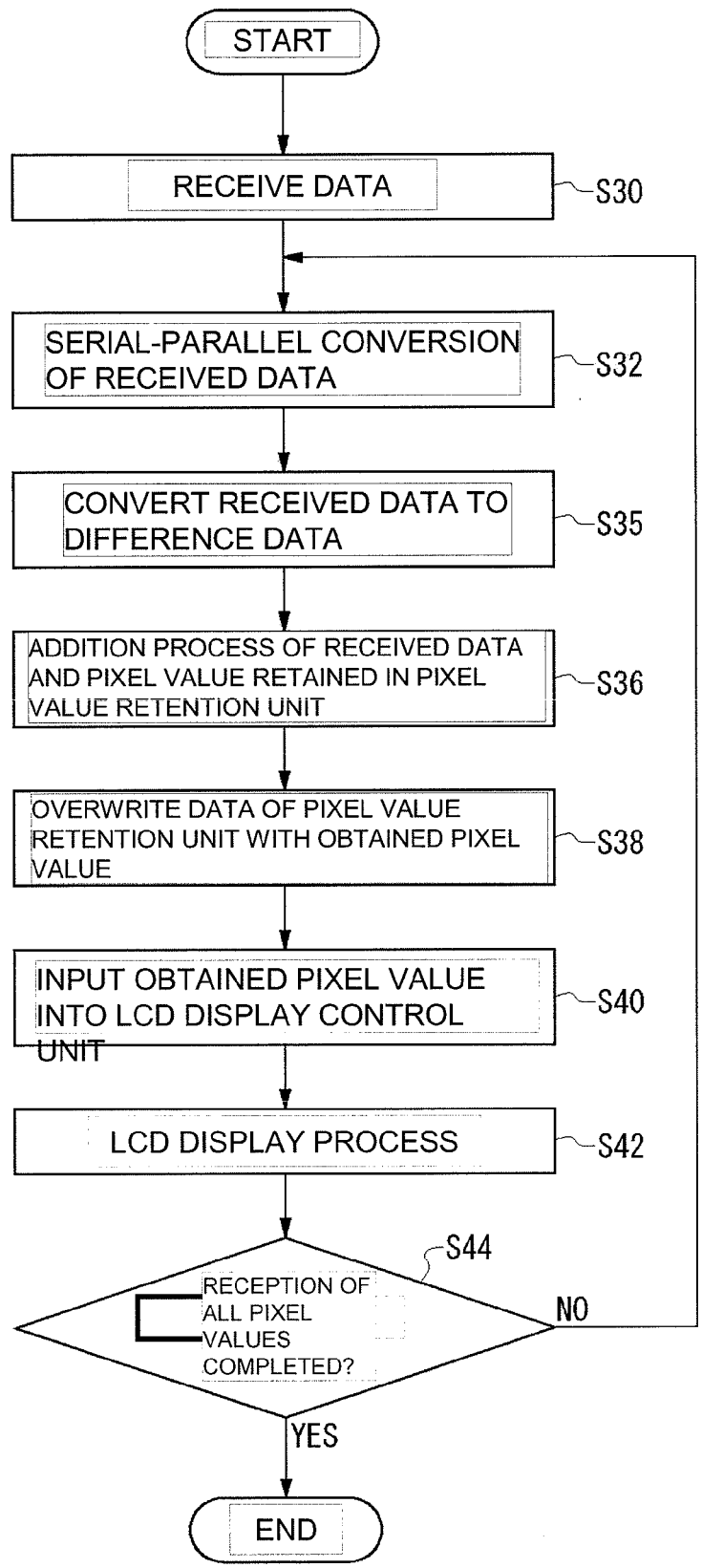
FIG. 10 is a flow chart showing the operation of the display device LCD of the second embodiment.

FIG. 10 is a drawing showing the operation of the display device LCD 20 of the second embodiment. The basic operation of the display device LCD 20 of the second embodiment is the same as that of the display device LCD 20 of the first embodiment. In the second embodiment, after the display device LCD 20 subjects the received data to serial-parallel conversion (S32), a process of reverse conversion by the difference data reverse conversion processing unit 27 (S35) is added. Hereinabove, the configurations and operations of the system LSI 10 and the display device LCD 20 of the second embodiment have been explained mainly about the points different from the first embodiment.

The system LSI 10 of the second embodiment converts the data of the difference value having a high appearance frequency to the transmission data having a small number of signal changes and outputs the converted transmission data to the data signal line 32; therefore, the number of signal changes in the data signal line 32 can be further reduced, and power consumption can be reduced.

(Third Embodiment)

Figure 11:
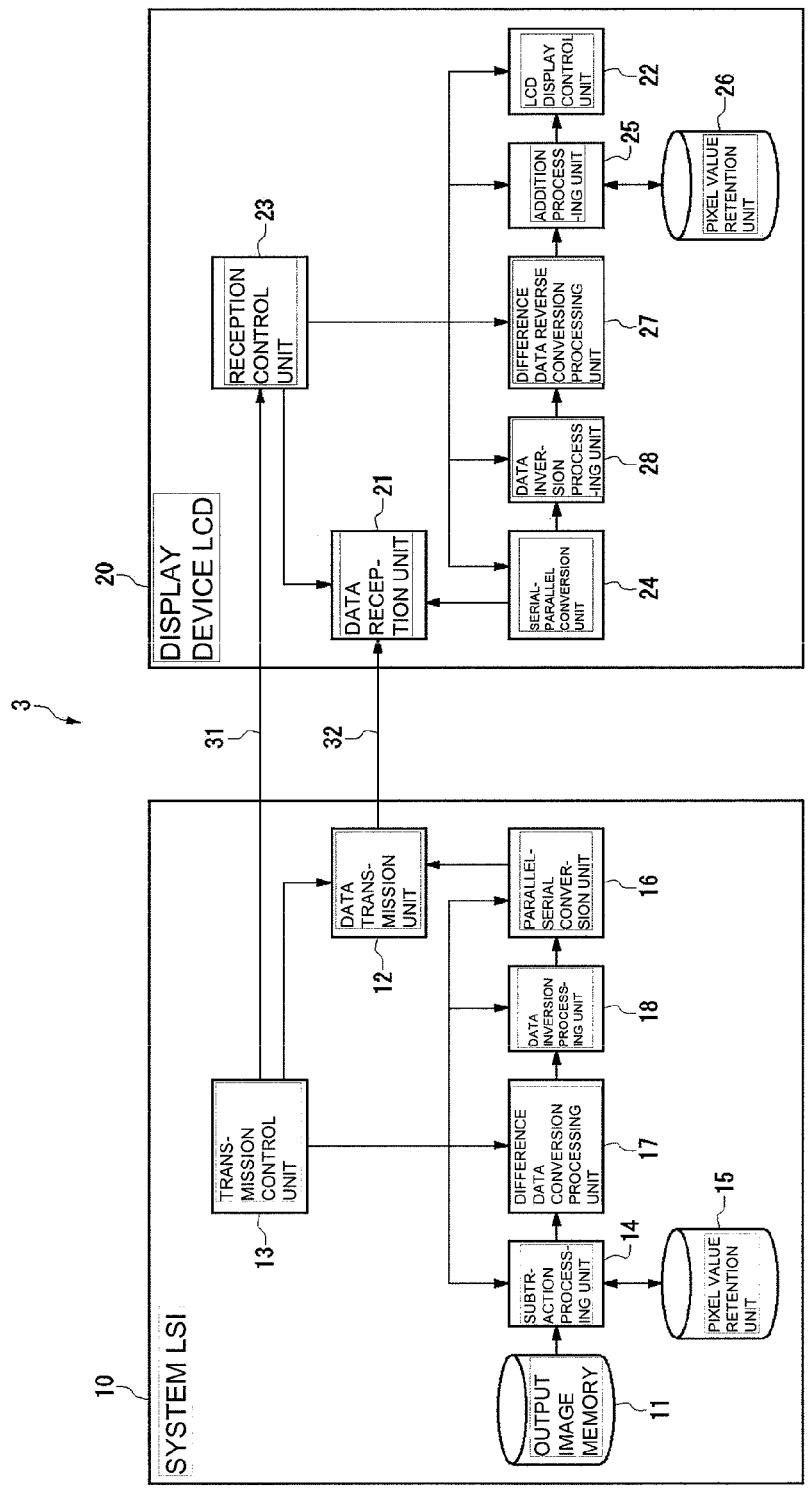
FIG. 11 is a drawing showing the configuration of a system LSI and a display device LCD of a third embodiment.

FIG. 11 is a drawing showing the configuration of a display system 3 of a third embodiment. The basic configuration of the display system 3 of the third embodiment is the same as that of the display system 2 of the second embodiment. In the third embodiment, the system LSI 10 further has a data inversion processing unit 18, which subjects the transmission data converted by the difference data conversion processing unit 17 to an inversion process in accordance with needs. Moreover, the display device LCD 20 further has a data inversion processing unit 28, which inverts the received data in accordance with needs.

When a least significant bit of the pixel data output immediately before pixel data by the difference data conversion processing unit 17 is "1", the data inversion processing unit 18 possessed by the system LSI 10 inverts the pixel data and outputs the inverted transmission data to the parallel-serial conversion unit 16. When the least significant bit of the pixel data output immediately before the pixel data by the difference data conversion processing unit 17 is "0", the data inversion processing unit 18 outputs the transmission data to the parallel-serial conversion unit 16 without changing the transmission data instead of carrying out the inversion process.

If the pixel data is composed of a plurality of components such as R, G, and B, the immediately-before component is referenced to carry out the inversion. In this case, the least significant bit of the component B of the immediately-before pixel data serves as the determination bit of the inversion process of the component R, the least significant bit of the component R of the same pixel serves as the determination bit of the inversion process of the component G, and the least significant bit of the component G of the same pixel serves as the determination bit of the inversion process of the component B. This is for the reason that in the order of the data that flows through a serial bus, whether the inversion is to be carried out or not is determined depending on the immediately-before value.

When the least significant bit of the pixel data received immediately before next received data from the serial-parallel conversion unit 24 is "1", the data inversion processing unit 28 possessed by the display device LCD 20 inverts the next received data and outputs the inverted received data to the difference data reverse conversion processing unit 27. When the least significant bit of the data received immediately before from the serial-parallel conversion unit 24 is "0", the data inversion processing unit 28 outputs the received data to the difference data reverse conversion processing unit 27 without changing the received data.

If the pixel data is composed of a plurality of components such as R, G, and B, whether the inversion is to be carried out or not is determined depending on the immediately-before value in the order of the data that flows through the serial bus. For example, the least significant bit of the component B of the immediately-before pixel data serves as the determination bit of the inversion process of the component R, the least significant bit of the component R of the same pixel serves as the determination bit of the inversion process of the component G, and the least significant bit of the component G of the same pixel serves as the determination bit of the inversion process of the component B.

Figure 12:
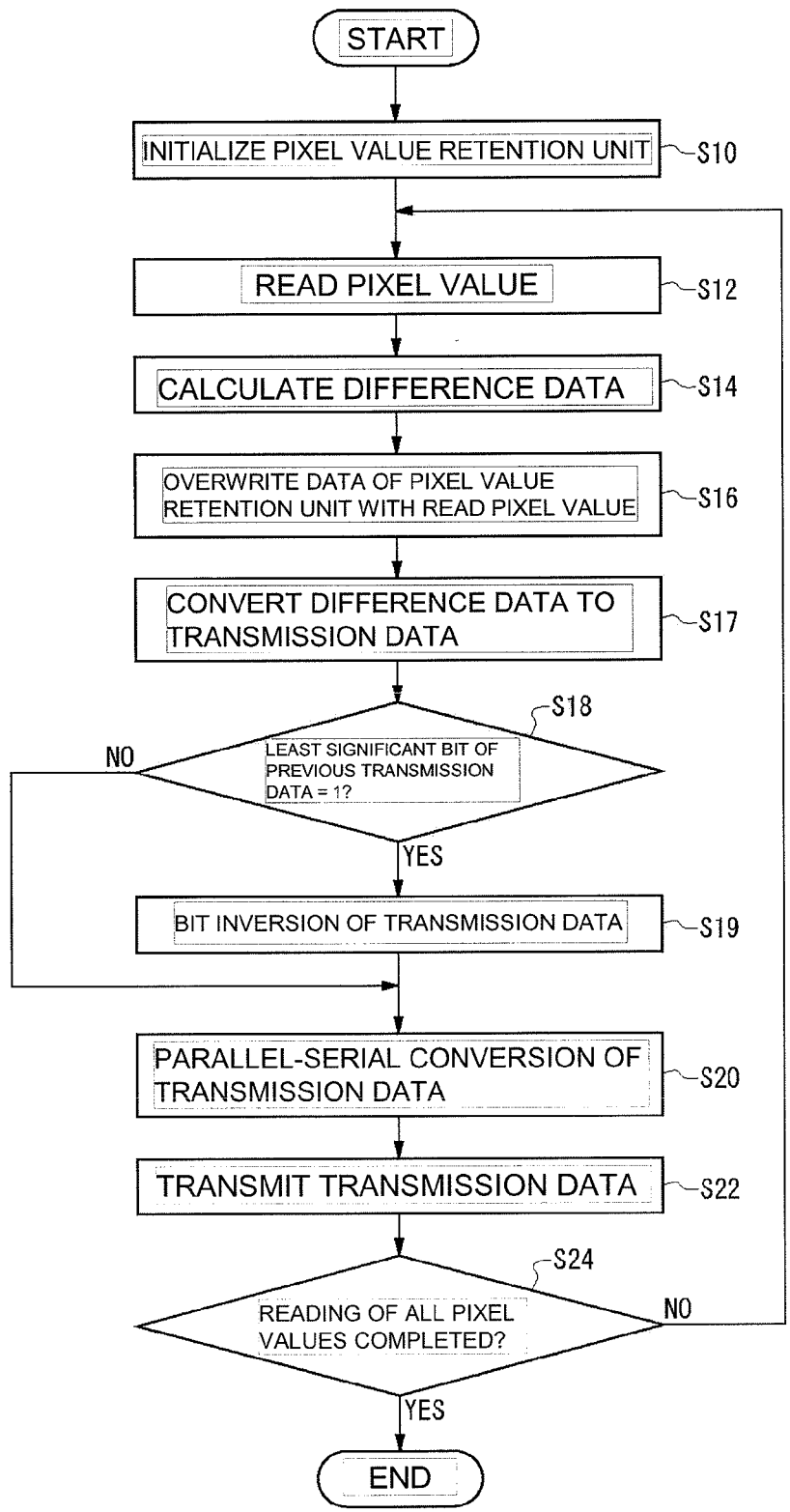
FIG. 12 is a flow chart showing the operation of the system LSI of the third embodiment.

FIG. 12 is a drawing showing the operation of the system LSI 10 of the third embodiment. The basic operation of the system LSI 10 of the third embodiment is the same as the operation of the system LSI 10 of the second embodiment. In the third embodiment, the system LSI 10 carries out the process of converting the difference data to the transmission data by the difference data conversion processing unit 17 (S17); and, then, the processes of: determining whether the least significant bit of previous transmission data is "1" or not (S18) and, if the least significant bit is determined to be "1" (YES in S18), inverting the bit of the transmission data (S19) are added.

Figure 13:
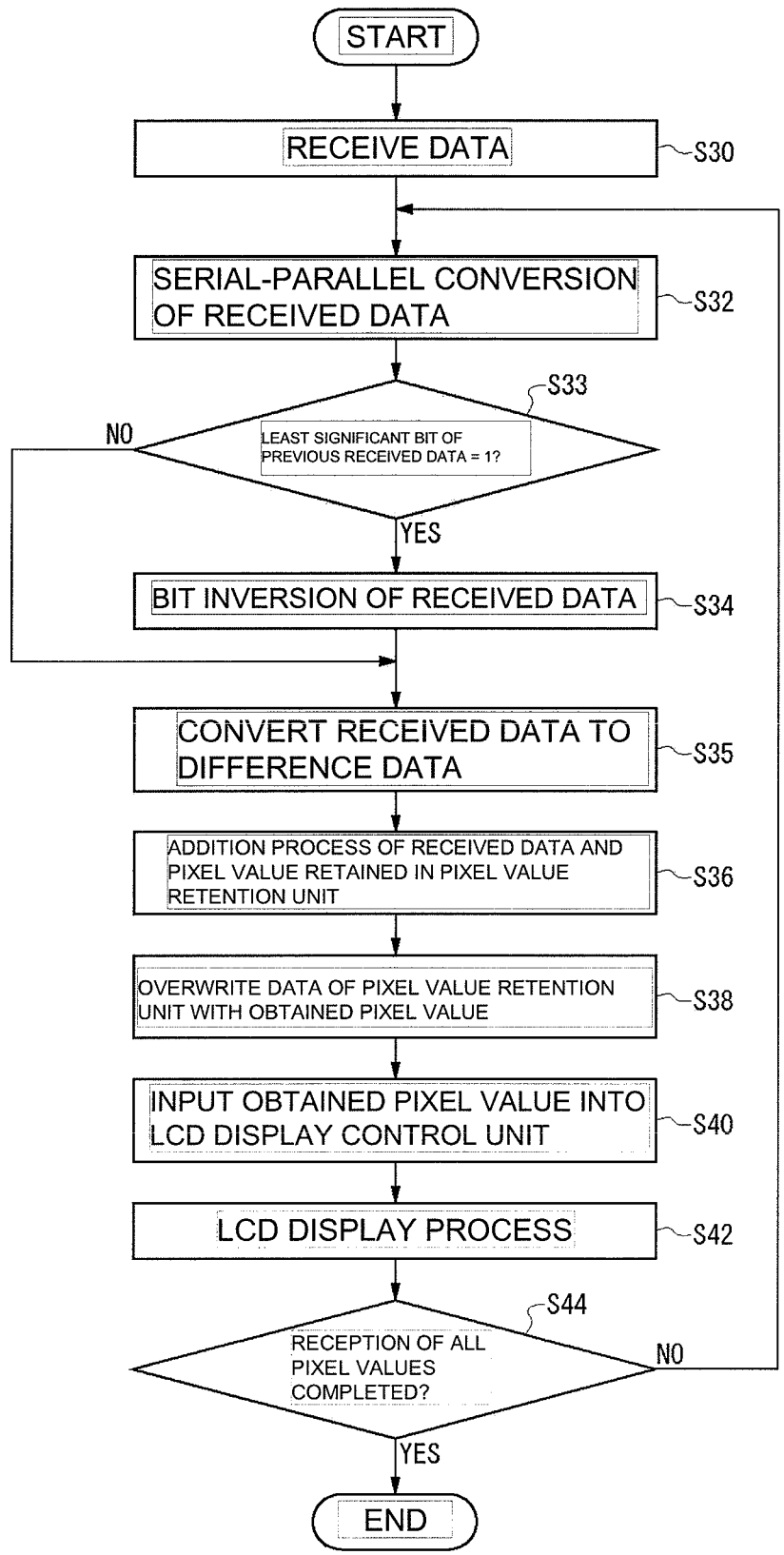
FIG. 13 is a flow chart showing the operation of the display device LCD of the third embodiment.

FIG. 13 is a drawing showing the operation of the display device LCD 20 of the third embodiment. The basic operation of the display device LCD 20 of the third embodiment is the same as that of the display device LCD 20 of the second embodiment. In the third embodiment, the display device LCD 20 subjects the received data to serial-parallel conversion (S32); and, then, the processes of: determining whether the least significant bit of the previous received data is "1" or not (S33) and, if the least significant bit is determined to be "1" (YES in S33), inverting the bits of the received data (S34) are added. Hereinabove, the configurations and the operations of the system LSI 10 and the display device LCD 20 of the third embodiment have been explained mainly about the points different from the second embodiment.

When the least significant bit of the immediately-before transmission data is "1", the system LSI 10 of the third embodiment inverts the bits of the subsequent transmission data, thereby suppressing the signal change generated between the transmission data and the transmission data subsequent to that. Hereinafter, this point will be explained.

Figure 14A:
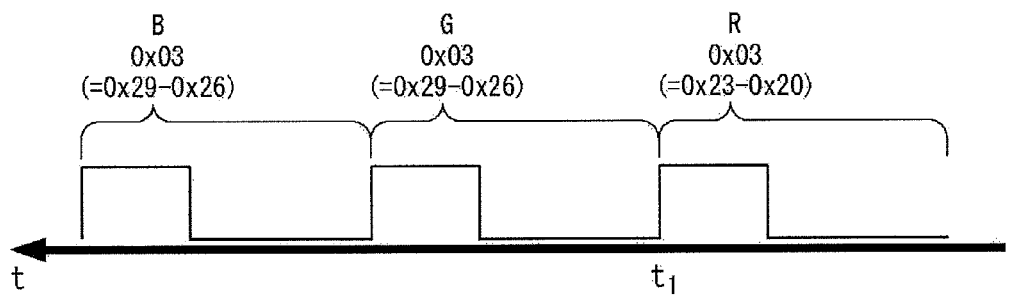
FIG. 14A is a drawing showing an example of a signal change of the case in which a least significant bit is "1".
Figure 14B:
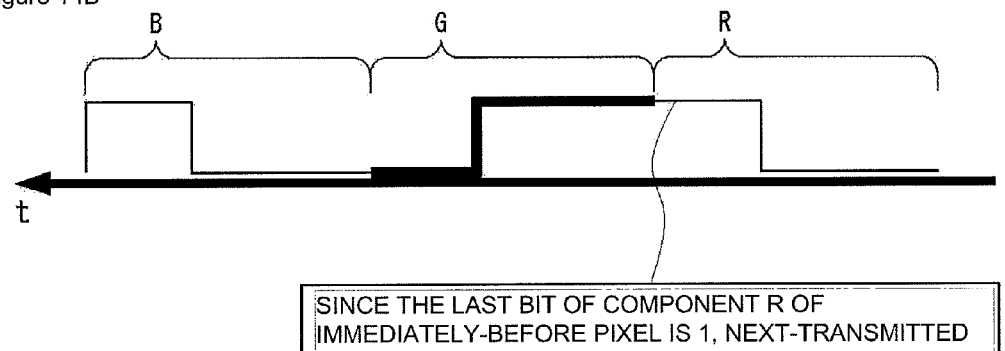
FIG. 14B is a drawing showing an example of a signal change in the case in which a data inversion process is carried out.

The values of the difference data close to 0 have extremely high appearance frequencies as shown in FIG. 5. Moreover, most of the values of the difference data close to 0 are converted to the values starting with 0 as shown by the values of the conversion destination of the table of FIG. 8. Therefore, the probability that the most significant bit of the transmission data is "0" is high. Therefore, as shown in FIG. 14A, for example when the least significant bit of the transmission data of the value of R is "1", a signal change is generated between the least significant bit and the transmission data of the value of G subsequent to that (see time t1). According to the present embodiment, when the least significant bit of the previous transmission data is "1", the next transmission data is inverted so that the most significant bit of the next transmission data becomes "1"; therefore, as shown in FIG. 14B, the signal change between the transmission data and the transmission data subsequent to that can be suppressed.

When the configuration of the third embodiment is employed, the conversion table used in the difference data conversion processing unit 17 adjusts data so that, if the number of signal changes of the conversion destination of the data is the same, "1" is set at the most significant bit of the conversion destination data obtained by converting the difference data having a large absolute value and that "0" is set at the most significant bit of the conversion destination data obtained by converting the difference data having a small absolute value. Thus, the probability that the most significant bit of the conversion destination data becomes "1" is reduced. As described above, in the third embodiment, the inversion process is carried out on the assumption that the most significant bit of the transmission data is "0" in many cases; therefore, the data changes mutually between the transmission data can be appropriately reduced by reducing the probability that "1" appears in the most significant bit.

When the present inventors carried out experiments by using the sample images same as the sample images used in the experiments in the first embodiment, it was confirmed that the number of signal changes in the data signal line 32 was reduced nearly by 67% to 80% compared with the case in which the pixel data was transmitted without change.

(Fourth Embodiment)

Figure 15:
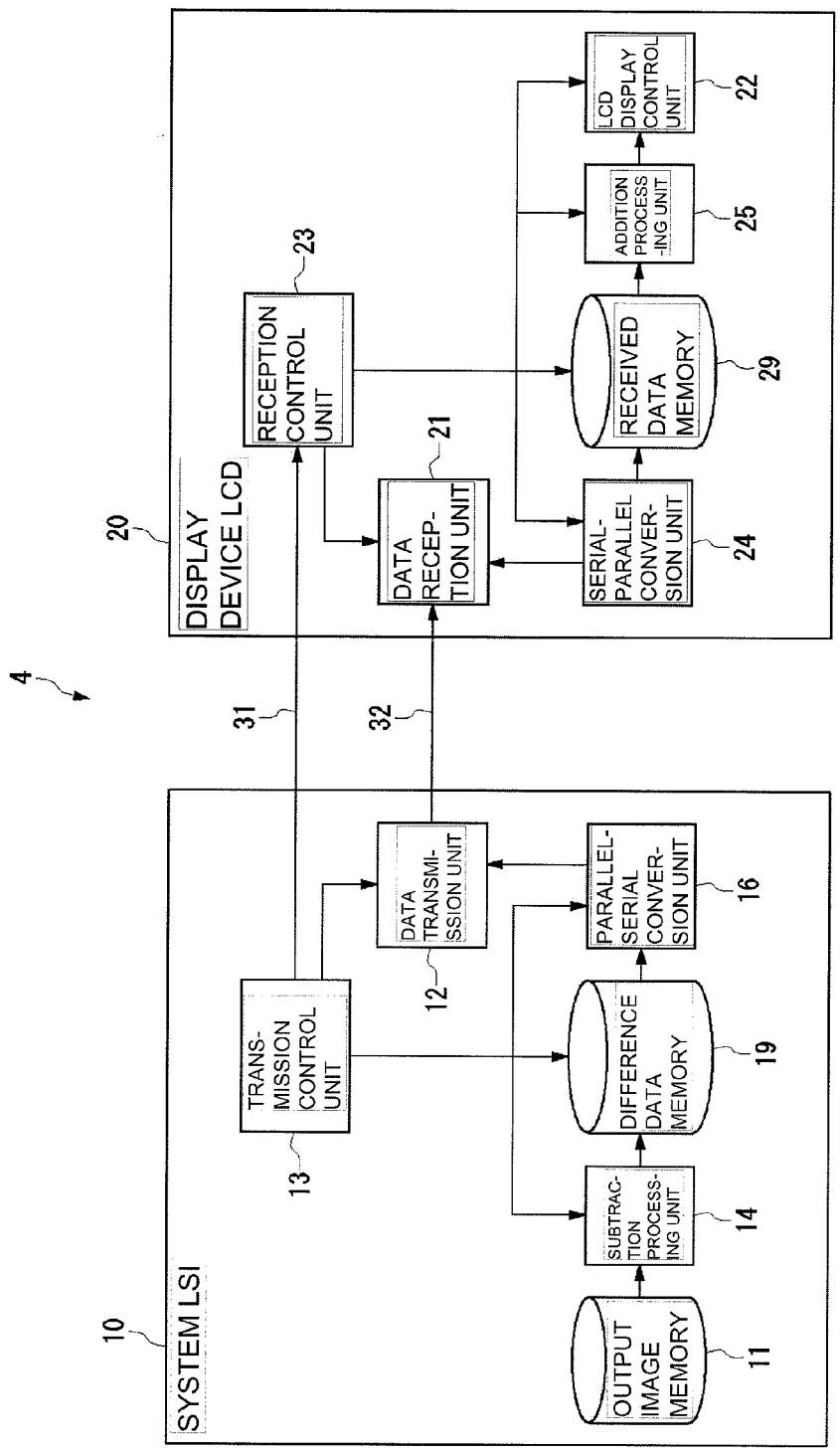
FIG. 15 is a drawing showing the configuration of a system LSI and a display device LCD of a fourth embodiment.

FIG. 15 is a drawing showing the configuration of the system LSI 10 and the display device LCD 20 of a fourth embodiment. The first to third embodiments have explained the example in which the subtraction processing unit 14 and the addition processing unit 25 process the pixels one by one, and the data of the immediately-before pixel is retained in the pixel value retention unit 15; however, in the fourth embodiment, the system LSI 10 has a difference data memory 19 instead of the pixel value retention unit 15 so that the data of a plurality of differences can be stored. The display device LCD 20 has a received data memory 29 instead of the pixel value retention unit 26 so as to retain the received data of a plurality of pixels, and the addition processing unit 25 reads the received data from the received data memory 29 and processes the received data.

FIG. 16A is a drawing showing an example of the pixel values of the pixels composing image data. The pixel data shown in FIG. 16A is stored in the output image memory 11. FIG. 16B is a drawing showing the data of the differences from adjacent pixels (the data of the difference from the left adjacent pixel; regarding each of leftmost pixels, the data of the difference from the right-most pixel of a line immediately above the pixel).

Figure 17:
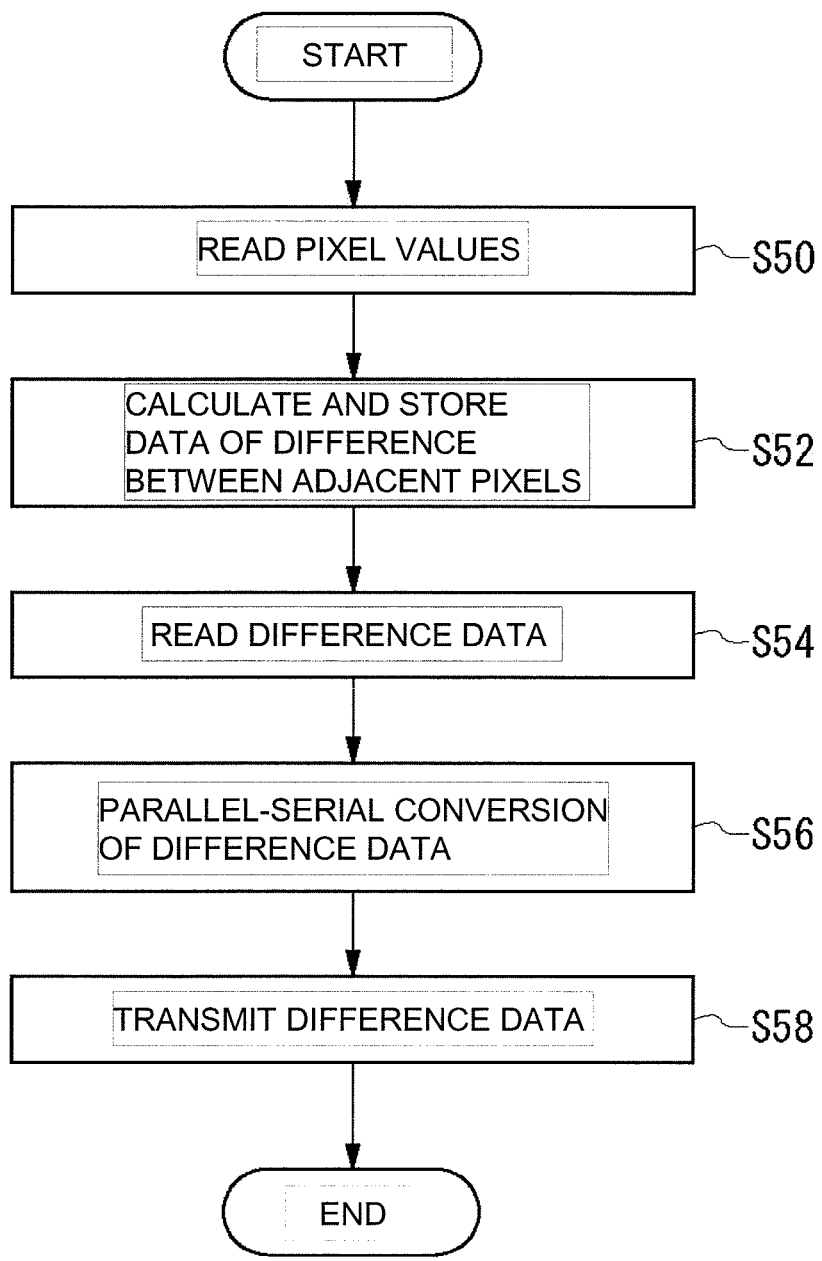
FIG. 17 is a flow chart showing the operation of the system LSI of the fourth embodiment.

FIG. 17 is a drawing showing the operation of the system LSI 10 of the fourth embodiment. With reference to FIG. 16A, FIG. 16B, and FIG. 17, the system LSI 10 of the fourth embodiment will be explained. The subtraction processing unit 14 of the system LSI 10 reads the data of the pixel value of each of the pixels shown in FIG. 16A from the output image memory 11 (S50) and calculates the difference from the left adjacent pixel (S52), thereby obtaining the difference data as shown in FIG. 16B. Then, the difference data is stored in the difference data memory 19 (S52). The parallel-serial conversion unit 16 reads the difference data from the difference data memory 19 (S54), subjects the difference data to parallel-serial conversion (S56), and then transmits the data from the data transmission unit 12 (S58).

Figure 18:
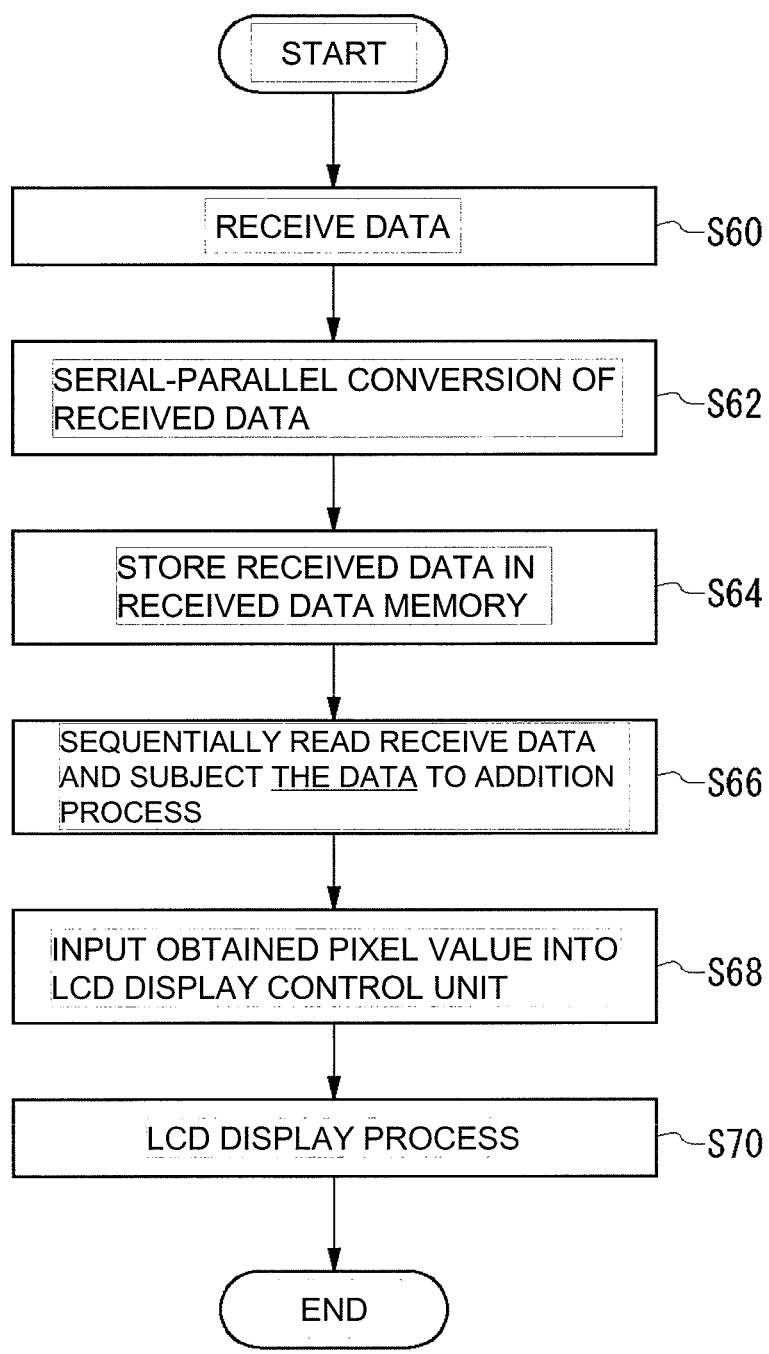
FIG. 18 is a flow chart showing the operation of the display device LCD of the fourth embodiment.

FIG. 18 is a drawing showing the operation of the display device LCD 20 of the fourth embodiment. In the display device LCD 20, the data transmitted through the data signal line 32 is received (S60), the received data is subjected to serial-parallel conversion (S62), and the data is then stored in the received data memory 29 (S64). In the received data memory 29, the data shown in FIG. 16B is stored.

The addition processing unit 25 sequentially reads the data stored in the received data memory 29 and subjects the data to the addition (S66), thereby obtaining the data of the original pixel values. The addition processing unit 25 inputs the data of the obtained pixel values into the LCD display control unit 22 (S68) and displays the image thereof by LCD (S70). Hereinabove, the system LSI and the display device LCD 20 of the fourth embodiment have been explained.

Also in the fourth embodiment, the number of signal changes of the data signals flowing through the data signal line 32 can be reduced, and power consumption can be reduced as well as the above described first to third embodiments.

Hereinabove, the image transmitter and the image receiver of the present invention have been explained in detail by the embodiments; however, the present invention is not limited to the above described embodiments.

In the present embodiments, the image transmitter has been explained by using the system LSI 10 as an example; however, the scope of the present invention includes the programs for realizing the same processes as the processes executed by the above described system LSI 10. Also, regarding the image receiver, similarly, the scope of the present invention includes the programs for realizing the same processes as the processes executed by the display device LCD 20.

In the above described second embodiment, the example in which the difference data conversion processing unit 17 converts the difference data to the transmission data by using the conversion table has been explained; however, the conversion table is not necessarily required to be used, and conversion functions may be used.

In the above described embodiment, the example in which the initialization of the pixel value retention unit 15 is carried out before reading the image data has been explained; however, the initialization of the pixel value retention unit 15 may be carried out, for example, every time one line is read. When explained with reference to the example shown in FIG. 2A, the pixel value retention unit 15 may be initialized after reading of one line is finished and a rightmost pixel value is read and before the leftmost pixel value of a line below that line is read. However, since the leftmost pixel and the rightmost pixel often have similar values, carrying the initialization only once at the beginning like the above described embodiments is good in some cases.

In the above described embodiments, the example in which the image transmitter (system LSI 10) and the image receiver (display device LCD 20) are connected to each other by the serial data signal line 32 has been explained; however, the data signal line 32 may be a parallel signal line.

In the third embodiment, the configuration having the data inversion processing unit 18 in addition to the configuration of the second embodiment has been explained; however, the data inversion processing unit 18 can be added to the configuration of the first embodiment. Also in the first embodiment, the most significant bit of the difference data often becomes "0"; therefore, the effect of reducing the number of signal changes between pixels can be obtained by inverting the next difference data when the least significant bit of the previous difference data is "1".

Figure 2B:
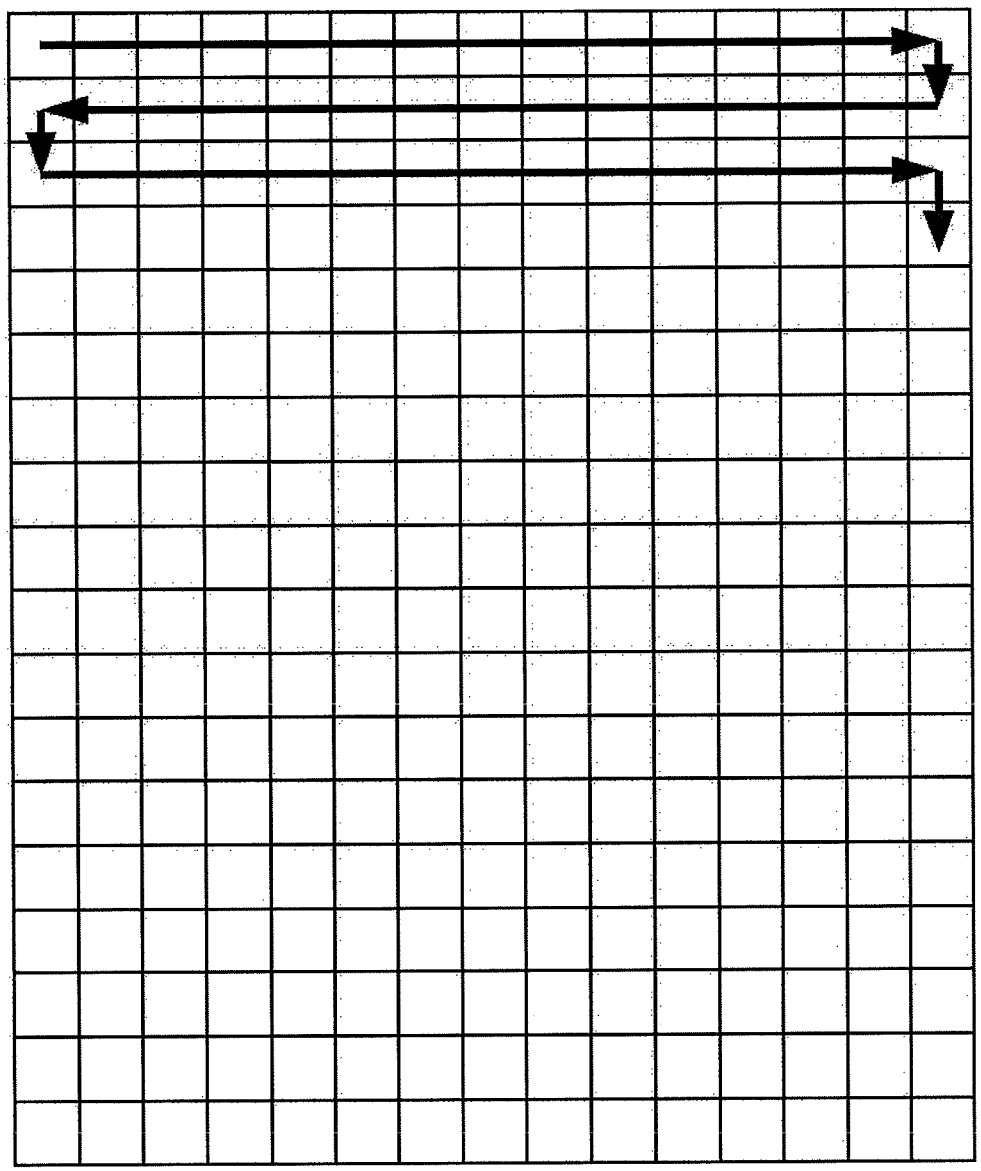
FIG. 2B is a drawing showing another example of the reading order of pixels.

In the above described embodiments, the example in which the system LSI 10 reads the pixel values from the output image memory 11 in accordance with the scanning direction has been explained; however, the order of reading the pixel values is not limited to the scanning direction. For example, as shown in FIG. 2B, the pixel values may be read from the upper left corner toward the right; at the point of reaching the right end, the pixel value of the lower adjacent pixel may be read; and the pixel values may be read toward the left therefrom. When the pixel values are read in this order, the pixel value of the adjacent pixel can be always read; therefore, it is expected that the range in which the difference data having small values can be obtained will be increased. Moreover, the reading order is not limited to the example shown in FIG. 2B, and, for example, the pixel values may be read spirally. However, if the reading direction is different from the scanning direction, the display device LCD 20 requires a process of reading the pixel values in accordance with the scanning direction after once the image data is generated, instead of sequentially transmitting the data of the received pixel values to the LCD display control unit 22.

The preferred embodiments of the present invention which are conceivable at the present point have been explained above. However, various modifications can be made with respect to the present embodiments, and the appended claims are intended to include all of such modifications which are within the true spirit and scope of the present invention.

Industrial Applicability

As explained above, according to the present invention, power consumption can be reduced by the simple configurations, and the present invention is effective as a device for transmitting/receiving image data, for example, between a camera and LSI or LSI and LCD.

Reference Signs List
10 SYSTEM LSI
11 OUTPUT IMAGE MEMORY
12 DATA TRANSMISSION UNIT
13 TRANSMISSION CONTROL UNIT
14 SUBTRACTION PROCESSING UNIT 15 PIXEL VALUE RETENTION UNIT
16 PARALLEL-SERIAL CONVERSION UNIT
17 DIFFERENCE DATA CONVERSION PROCESSING UNIT
18 DATA INVERSION PROCESSING UNIT
19 DIFFERENCE DATA MEMORY
20 DISPLAY DEVICE LCD
21 DATA RECEPTION UNIT
22 LCD DISPLAY CONTROL UNIT
23 RECEPTION CONTROL UNIT
24 SERIAL-PARALLEL CONVERSION UNIT
25 ADDITION PROCESSING UNIT
26 PIXEL VALUE RETENTION UNIT
27 DIFFERENCE DATA REVERSE CONVERSION PROCESSING UNIT
28 DATA INVERSION PROCESSING UNIT
29 RECEIVED DATA MEMORY
31 CONTROL SIGNAL LINE
32 DATA SIGNAL LINE (SERIAL BUS)

The invention claimed is:

1. An image transmitter for transmitting image data to a device connected by a data signal line, the image transmitter comprising:
an image data retainer that stores the image data to be transmitted;
a pixel value retainer that stores a pixel value read from the image data retainer;
a subtraction processor that sequentially reads the pixel value of an adjacent pixel of the image data from the image data retainer, obtaining, every time the pixel value is read, data of a difference between the read pixel value and the pixel value retained in the pixel value retainer, and overwriting the pixel value retained in the pixel value retainer with the pixel value read from the image data retainer;
a difference data converter that converts the difference data obtained by the subtraction processor to transmission data, wherein the closer the value of the difference data to 0, the smaller the number of signal changes when the transmission data converted by the difference data converter is expressed as a binary number; and
a data transmitter that sequentially outputs a data signal expressing the transmission data as the binary number to the data signal line, the transmission data converted by the difference data converter.

2. The image transmitter according to claim 1, further comprising
a parallel-serial converter that subjects the difference data to be transmitted to the data signal line to parallel-serial conversion.

3. The image transmitter according to claim 2, further comprising:
a transmission controller that controls timing of outputting the data signal from the data transmitter and outputting a control signal to a control signal line connected to the device of a receiver of the data signal; wherein
the pixel value retainer is initialized based on the control signal transmitted by the transmission controller.

4. The image transmitter according to claim 2, wherein
the data signal is output to the data signal line in an order from a most significant bit to a least significant bit;
the transmitter further comprising a data inverter that inverts the value of each bit of the data signal to be output next if the least significant bit of the data signal output immediately before the data signal to be output next to the data signal line is "1"; and
the data transmitter outputs the data signal inverted by the data inverter to the data signal line.

5. The image transmitter according to claim 1, further comprising:
a transmission controller that controls timing of outputting the data signal from the data transmitter and outputting a control signal to a control signal line connected to the device of a receiver of the data signal; wherein
the pixel value retainer is initialized based on the control signal transmitted by the transmission controller.

6. The image transmitter according to claim 1, wherein
the data signal is output to the data signal line in an order from a most significant bit to a least significant bit;
the data transmitter further comprises data inverter that inverts the value of each bit of the data signal to be output next if the least significant bit of the data signal output immediately before the data signal to be output next to the data signal line is "1"; and
the data transmitter outputs the data signal inverted by the data inverter to the data signal line.

7. An image receiver for receiving image data from a device connected by a data signal line by receiving pixel values composing the image data as a data signal obtained by converting a difference between mutually adjacent pixels to transmission data, the image receiver comprising:
a data receiver that receives the data signal transmitted via the data signal line;
a pixel value retainer that stores a pixel value obtained from the data signal transmitted via the data signal line;
a difference data reverse converter that carries out reverse conversion of conversion carried out in the device of a transmitter with respect to the data signal received by the data receiver so as to obtain data of a difference from a pixel received immediately before the received data signal; and
an addition processor that adds the obtained difference data and the immediately-before pixel value retained in the pixel value retainer every time the data of the difference from the immediately-before pixel is obtained by the difference data reverse converter so as to obtain a pixel value according to the data signal received by the data reception unit and overwriting the pixel value retained in the pixel value retainer with the obtained pixel value; wherein
the image data is generated by the pixel value obtained by the addition processor.

8. The image receiver according to claim 7, further comprising
a serial-parallel converter that subjects the data signal received from the data signal line to serial-parallel conversion.

9. The image receiver according to claim 8, further comprising
a reception controller that receives a control signal transmitted from the device of a transmitter of the image data via a control line; wherein
the pixel value retainer is initialized based on the control signal received by the reception controller.

10. The image receiver according to claim 7, further comprising
a reception controller that receives a control signal transmitted from the device of a transmitter of the image data via a control line; wherein
the pixel value retainer is initialized based on the control signal received by the reception controller.

11. An image receiver for receiving image data from a device connected by a data signal line by receiving a data signal, the data signal expressing each pixel value composing the image data by a difference between mutually adjacent pixels, the data signal obtained by converting the difference between the mutually adjacent signals to transmission data, the data signal received as the transmission data in which the value of each bit of a next data signal is inverted if a least significant bit of a data signal immediately before the data signal is "1"; the image receiver comprising:

a data receiver that receives the data signal transmitted via the data signal line;

a pixel value retainer that stores the pixel value obtained from the data signal transmitted via the data signal line;

a data inverter that inverts the value of each bit of the data signal received next by the data reception unit if the least significant bit of the data signal received immediately before by the data receiver is "1";

a difference data reverse converter that subjects the received data signal or, if a data inversion process is carried out, the inverted data signal to reverse conversion of conversion carried out in the device of a transmitter every time the data signal is received by the data receiver so as to obtain the data of the difference from the pixel received immediately before; and an addition processor that adds the obtained difference data and the immediately-before pixel value retained in the pixel value retainer every time the data of the difference from the immediately-before pixel is obtained by the difference data reverse converter so as to obtain the pixel value according to the data signal received by the data reception unit and overwriting the pixel value retained in the pixel value retainer with the obtained pixel value; wherein the image data is generated by the pixel value obtained by the addition processor.

12. An image transmitting method for transmitting image data by an image transmitter to a device connected by a data signal line; the method comprising:

causing the image transmitter to read the image data from an image data retainer that stores the image data to be transmitted and to obtain data of a difference between mutually adjacent pixels of the image data; and causing the image transmitter to sequentially output a data signal to the data signal line in accordance with an arrangement of the pixels, the data signal expressing the difference data corresponding to the pixel as a binary number; wherein the data signal of the difference data, in which the number of signal changes is reduced more than in a case of outputting the pixel data to the data signal line, is output.

13. An image receiving method for receiving image data by an image receiver by receiving a pixel value composing the image data as a data signal from a device connected by a data signal line, the data signal expressing a difference between mutually adjacent pixels; the method comprising:

causing the image receiver to receive the data signal transmitted via the data signal line;

causing the image receiver to carry out a process of adding the received data signal and the pixel value according to a data signal received immediately before the received data signal in an order of reception of the data signal so as to obtain the pixel value according to the received data signal; and causing the image receiver to generate image data by the obtained pixel value and to retain the generated image data in an image data retainer.

14. A non-transitory computer readable medium including a program for transmitting image data to a device connected by a data signal line; the program causing a computer to execute:

reading the image data from an image data retainer that stores the image data to be transmitted and obtaining data of a difference between mutually adjacent pixels of the image data; and sequentially outputting a data signal to the data signal line in accordance with an arrangement of the pixels, the data signal expressing the difference data corresponding to the pixel as a binary number; wherein the data signal of the difference data in which the number of signal changes is reduced more than in a case of outputting the pixel data to the data signal line, is output.

15. A non-transitory computer readable medium including a program for receiving image data by receiving a pixel value composing the image data as a data signal from a device connected by a data signal line, the data signal expressing a difference between mutually adjacent pixels; the program causing a computer to execute:

receiving the data signal transmitted via the data signal line;

carrying out a process of adding the received data signal and the pixel value according to a data signal received immediately before the received data signal in an order of reception of the data signal so as to obtain the pixel value according to the received data signal; and generating image data by the obtained pixel value and retaining the generated image data in an image data retainer by the image receiver.

\* \* \* \* \*